United States Patent [19]
Gageby

[11] 3,917,352
[45] Nov. 4, 1975

[54] CONTINUOUS-STRAND, FIBER REINFORCED PLASTIC WHEEL

[76] Inventor: Steven Douglas Gageby, 2025 N. Bradley, St. Paul, Minn. 55117

[22] Filed: June 3, 1974

[21] Appl. No.: 476,058

Related U.S. Application Data

[63] Continuation-in-part of Ser. No. 340,342, March 12, 1973, abandoned.

[52] U.S. Cl. .......................... 301/63 PW; 301/63 R
[51] Int. Cl.² .......................................... B60B 1/06
[58] Field of Search .................... 301/63 R, 63 AW

[56] References Cited
UNITED STATES PATENTS 3,357,747  12/1967  Eldred .......................... 301/63 PW
3,369,843  2/1968  Prew .............................. 301/63 PW

*Primary Examiner*—Robert B. Reeves
*Assistant Examiner*—D. W. Keen
*Attorney, Agent, or Firm*—Jacobson and Johnson

[57]  ABSTRACT

A wheel having the hub portion constructed out of continuous filaments and a rim portion formed to the hub portion out of continuous filaments running from one side of the rim over the hub to the opposite side of the rim.

24 Claims, 35 Drawing Figures

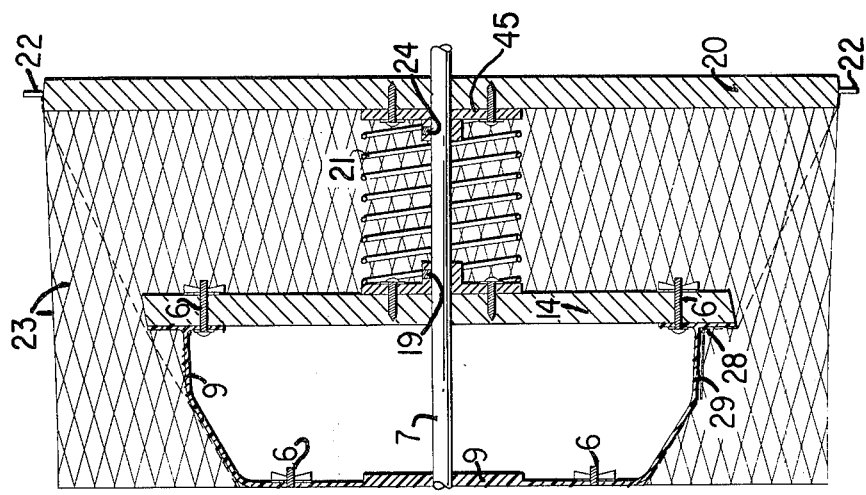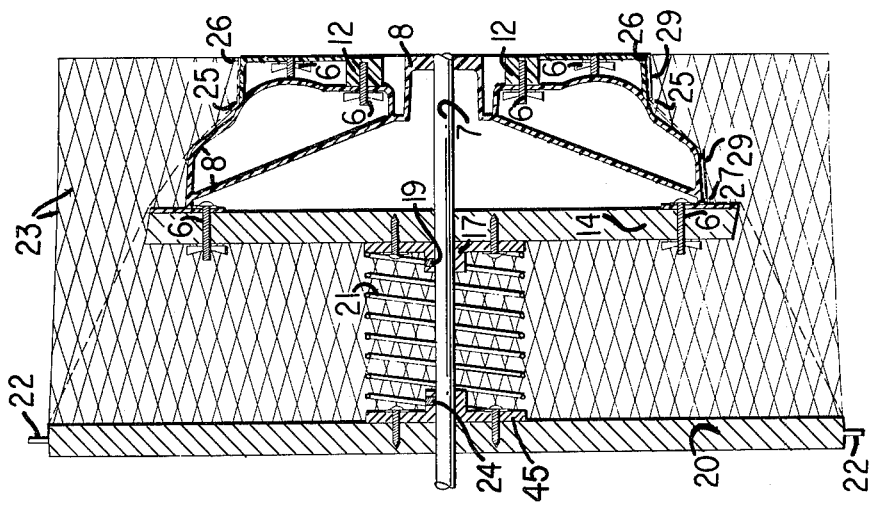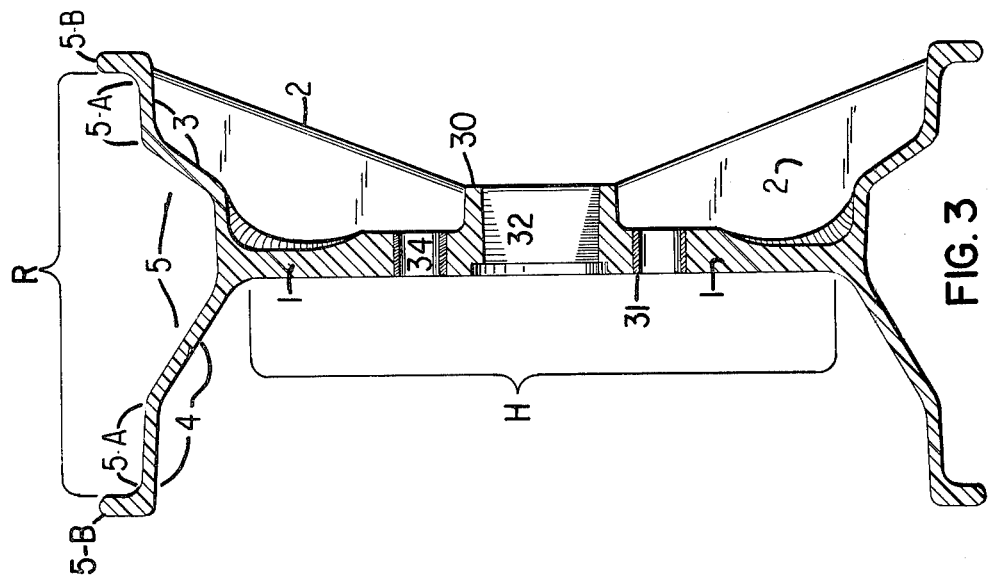

CONTINUOUS-STRAND, FIBER REINFORCED PLASTIC WHEEL

This is a continuation-in-part of my earlier application, Ser. No. 340,342, filed Mar. 12, 1973 now abandoned.

This invention is generally related to fiber reinforced plastic wheels and related fabrication methods, and is specifically directed to continuous or unbroken strand, fiber reinforced plastic wheels for use with pneumatic tires on motor vehicles, aircraft, and the like and the methods of fabricating such wheels.

Perhaps the most conventional form of wheel used on motor vehicles today is the steel wheel, which is formed primarily by a metal stamping process. Cast metal alloy wheels have also achieved popularity in limited areas of usage such as with racing vehicles. The advantageous features of the steel wheel reside primarily in simplicity of fabrication and relatively inexpensive manufacturing cost. However, because it must be designed to withstand substantial operational and static load forces, its material requirements render it unduly heavy. In addition, the continued increase in steel costs tend to lift the steel wheel from the category of being relatively inexpensive.

Cast metal alloy wheels offer the advantage of being much lighter in weight than their stamped steel counterparts, but they are substantially more expensive. Further, the cast alloy wheel is much less capable of withstanding operational forces over extended periods of time, and the resulting fatigue often leaves the wheel unsafe.

The inventive continuous-strand, fiber reinforced plastic wheel combines the advantages and features of existing wheel structures, but without the attendant disadvantages discussed above. The wheel structure itself is based on the principle that fiber glass filaments are capable of withstanding significant forces in tension without stretching or breaking. This effect is multiplied when the filament strands are used in groups or bands.

The design of my inventive wheel structure is based on this principle. Specifically, I dispose continuous or unbroken filament strands so that they extend in essentially straight lines from one point or region of force concentration to another. The cumulative disposition of continuous and unbroken filament strands is multidirectional in nature, so that every force imposed upon a wheel is resisted in tension by a plurality of filaments. Because the filaments at the point of force are multidirectionally disposed, the force is not only resisted in tension, but also is distributed uniformly throughout the adjacent structural system.

In particular, wheels adapted for use with pneumatic tires ordinarily include two circumferential bead areas proximate each edge of the rim where the tire engages the rim. These circumferential bead areas are subjected to severe torsional forces during acceleration and braking of the vehicle. To withstand these torsional forces, I dispose a plurality of resin impregnated filament lengths in diagonal (i.e., at an angle relative to the axis of wheel rotation) crisscross fashion between the respective bead areas, or between the respective bead areas and the circumferential central area of the rim. This enables the torsional forces to be fully resisted in tension by the continuous, unbroken filaments, whether the forces are directed outwardly from the wheel mounting to the tire during acceleration, or from the tire inwardly to the wheel mounting during braking.

The inventive principle is applied to the hub portion of the wheel as well, through the disposition of resin impregnated filaments which extend in essentially straight lines from the wheel mounting opening or openings to the wheel rim.

The methods of fabricating wheel structures broadly contemplate the continuous winding of filament relative to a negative pattern or mold. In one method of rim fabrication, a plurality of sheath tube filament layers are weaved relative to the negative mold, each consisting of a plurality of diagonally disposed, crisscross filaments. After each sheath tube is formed, it is conformed to the negative mold. In another method, filament is continuously wound back and forth between the circumferential bead areas, with the negative mold simultaneously rotated so that each filament length crosses and engages the mold surface in conformance with its configuration.

With regard to each of the methods disclosed, it is possible to introduce resin by first passing the filament through a resin bath, or at periodic intervals such as between filament layers, or after the filament matrix has been completely wound.

For each mold, the arrangement, pattern and amount of filament can be changed to suit the structural needs of each application; e.g., from high impact and static loads of aircraft and trucks to low static, high torsional needs of racing cars. The continuous filaments interlock all parts of the wheel, creating a monolithic unit that has a high resistance to breakage and failure.

By reason of the inventive design and materials used, the resulting wheel has comparable or greater strength than its stamped metal and cast alloy counterparts, while being far lighter and much less expensive to fabricate.

BRIEF DESCRIPTION OF THE DRAWINGS

FIG. 3 is an enlarged sectional view taken along the line 3—3 of FIG. 2;

FIGS. 5A and 5B are sectional views of the respective negative mold sections and rim winding discs in spaced, nonassembled relation, with a diagonal sheath tube of continuous filament wound relative thereto;

DESCRIPTION OF THE PREFERRED EMBODIMENTS

Figure 1:
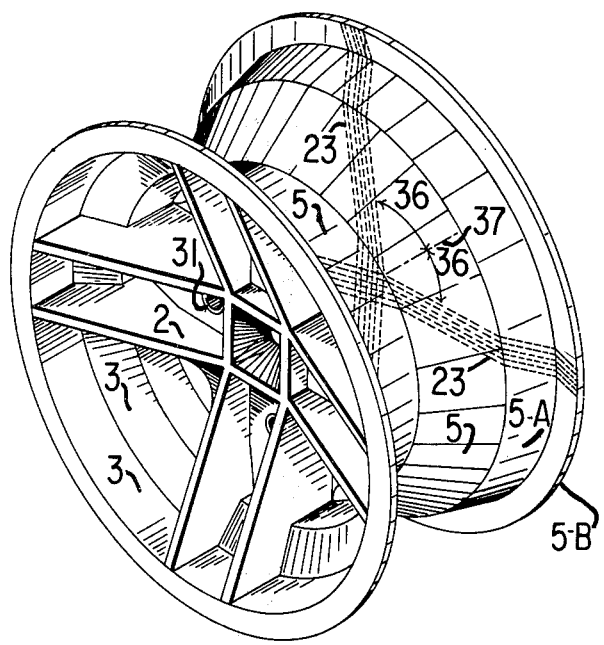
FIG. 1 is a perspective view of a continuous-strand, fiber reinforced plastic wheel made in accordance with the inventive principles and concepts herein described.
Figure 2:
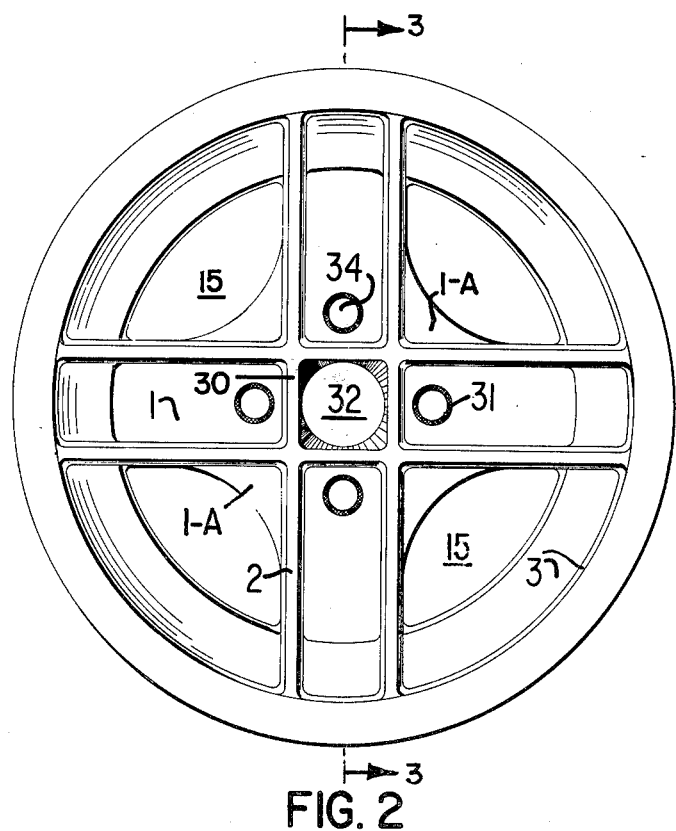
FIG. 2 is a view in side elevation of the inventive wheel.

FIGS. 1–3 depict a wheel intended for automobile use, and which is constructed in accordance with the inventive principles. With specific reference to FIG. 3, the general configuration of the wheel is conventional in nature, comprising a hub portion H which defines an axis of rotation and is adapted for rotatable mounting, and a circumferential rim portion R which is carried by the hub portion H and adapted to receive a tire.

The hub portion H consists of a wall or web 1 the structural configuration of which is chosen to provide sufficient strength in operation, and for appearance purposes as well. The center area of the web 1 projects axially forward to define a hub 30 through which a axial hub opening 32 is formed. Lug bolt mounting openings 34 (FIG. 2) are formed through the web 1 in symmetrical relationship to the hub opening 32 to permit mounting of the wheel with coventional lug bolts or studs.

Preferably, a pluality of strengthening flanges 2 extend between the hub 30 and the front internal rim area 3 of the rim portion R, projecting laterally and perpendicularly from the web 1. In the preferred embodiment, and as specifically shown in FIGS. 1 and 2, the hub 30 is square in shape, tapering to the circular hub opening 32, and the strengthening flanges 2 are disposed in parallel pairs. Viewed in the side elevation of FIG. 2, each of the flange pairs is disposed in alignment with one other flange pair and perpendicular to the other two flange pairs.

With continued reference to FIG. 2, and as will become more apparent below, the web 1 extends between each pair of parallel strengthening flanges 2. Between adjacent perpendicular strengthening flanges 2, the web takes the form of a filet, as represented by the numeral 1-A. The remaining area between perpendicular adjacent strengthening flanges 2 constitutes a opening which extends entirely through the hub portion H, as respresented by the numeral 15.

With specific reference to FIG. 3, the rim portion R is somewhat irregular in cross section, extending generally axially from each side of the hub portion H. As such, the rim portion R defines a front internal rim area 3, a rear internal rim area 4 and an external rim area 5. Each axial extremity of the rim portion R terminates in a bead area 5-A, which defines the area at which the bead of the tire engages the wheel. In this embodiment, the bead area 5-a extends essentially parallel with the rotational axis of the wheel. Preferably, the rim portion R further comprises bead flanges 5-B which extend radially outward from each of the tire engaging bead areas 5-A.

The manufacturing process of a wheel initially involves the formation of a positive pattern of the chosen wheel configuration, such as the one depicted in FIGS. 1–3. The positive pattern may be fabricated from any appropriate material using standard pattern making techniques. The positive pattern should be coated with a surfacing agent that is compatible with the tooling gel-coat used for the fabrication of a negative mold. The surfacing agent is smoothed to a mirror-like finish.

Next, a fiber reinforced plastic negative mold is made from the positive pattern, using standard fiber reinforced plastic pattern making techniques. It will be appreciated that this is the preferred approach, and that it is possible to make a negative mold directly without the use of a positive pattern, and with other materials appropriate with the intended purpose.

Figure 4:
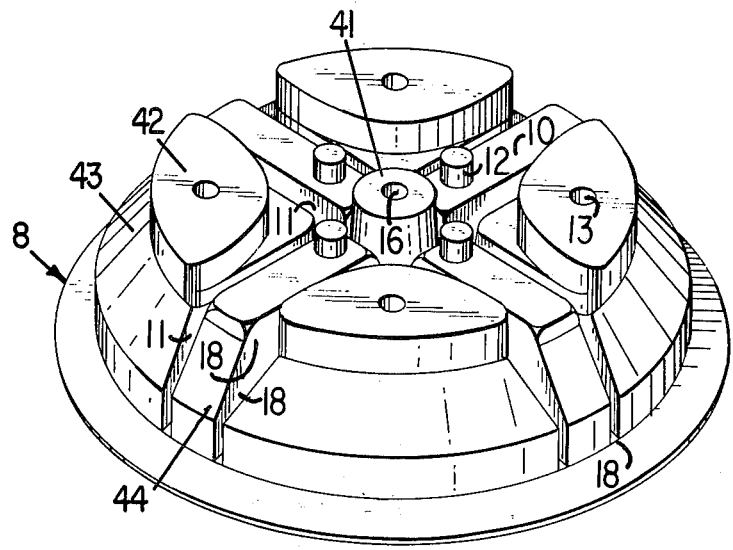
FIG. 4 is a perspective view of a negative mold section utilized in the formation of the inventive wheel of FIG. 1.

In the preferred embodiment, the negative mold is made in two pieces: a front negative mold 8, which is shown in FIGS. 4 and 5A; and a rear negative mold 9, which is shown in FIG. 5B. With reference to FIG. 4, the front negative mold 8 structurally complements the positive pattern through the inclusion of a center post 41 to define the hub opening 32 and four irregularly shaped projections 42 which define the irregular openings 15 in the web 1. The irregular projections 42 are respectively carried by four quadrant sections 43 which together define the desired hub configuration. Four spacing projections 44, which are essentially rectangular in cross section, are interposed between adjacent quadrant sections 43, thus defining a plurality of channels which form the flanges 2 for the wheel, as will be appreciated below. Each of the spacing projections 44 has a winding plug 12 secured thereto which, as best seen in FIG. 5A, is fastened to the mold by means of a threaded bolt 6 which passes through an opening in the associated spacing projection 44 and a wing nut. Preferably, the opening for the threaded bolt 6 is sloted in the radial direction (not shown), which permits the lug bolt hole plugs to be adjusted radially for various wheel configurations. The lug bolt plugs 12 are made from wood or a similar substance permitting them to be easily drilled out after completion of the wheel. The top surface of each lug bolt hole plug 12 lies in the plane of the upper surfaces of the irregular projections 42, as best seen in FIG. 5A. The difference in depth between the top surface of the irregular projections 42 and the spacing projections 44 defines the web 1 for the produced wheel, and is represented by the numeral 10.

The numeral 18 designates the interface area on the front negative mold 8 between each of the web-defining areas 10 and flange-defining channels 11, and the rim-defining surface of the mold.

The centerpost 41 of front negative mold 8 has an axial opening 16 formed therethrough to receive a mounting shaft, as will be described below. Each of the irregular projections 42 has a hole 13 formed to receive fastening bolts 6 (FIG. 5A) which are used to secure the negative molds 8, 9 together.

With reference to FIGS. 5A and 5B, as compared with the sectional wheel representation of FIG. 3, it will be seen that the front and rear negative molds 8, 9 merge on the vertical center line of the wheel on the rear side of the web. The rear negative mold 9 is similar to the front negative mold 8, but it does not have flange defining channels 11, the web defining area 10, the centerpost 41 or the lug bolt hole plugs 12. Rear negative mold 9 does, however, include holes corresponding to the holes 13 of mold 8, and an axial opening corresponding to the axial opening 16 of mold 8.

In the preferred embodiment, each of the negative mold halves 8, 9 is hollow in order that cooling agents may be introduced after the wheel has been formed, which permits release of the mold from the wheel by way of contraction. Each of the negative mold havles 8, 9 is provided with a reinforcing disc 14 which is fastened to a circumferential flange at the back of the mold to strengthen and stabilize the mold during the wheel forming process. A spring flange 17 is secured to each of the reinforcing discs 14, each flange 17 having a bore which is disposed in coaxial relationship with the opening 16.

Fabrication of the wheel begins with mounting of the lug bolt hole plugs 12 in the desired position on the front negative mold 8. The reinforcing disc 14 is then bolted in place, together with its spring flange 17. The assembled unit is placed on a rotating platform, preferably in a horizontal position, or over a short shaft that passes through the spring flange 17. The front negative mold 8 should be free to rotate on the platform or shaft.

Prior to winding of the filament, a gel coat of desired thickness and color is applied entirely over both negative mold halves and allowed to set.

Figure 7:
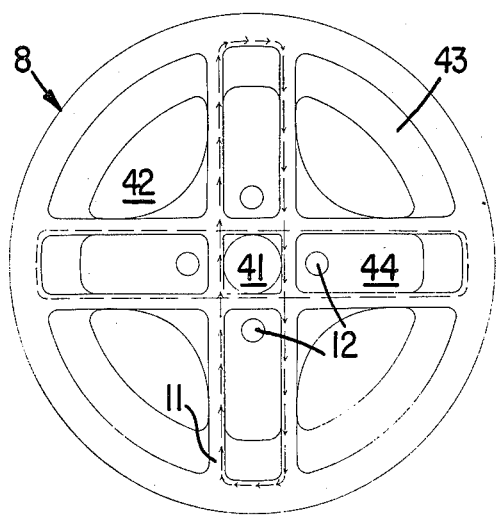
FIGS. 7–10 are diagrammatic views in side elevation of the front negative mold section of FIG. 4, each showing a specific continuous winding pattern of filament to define support flanges.
Figure 8:
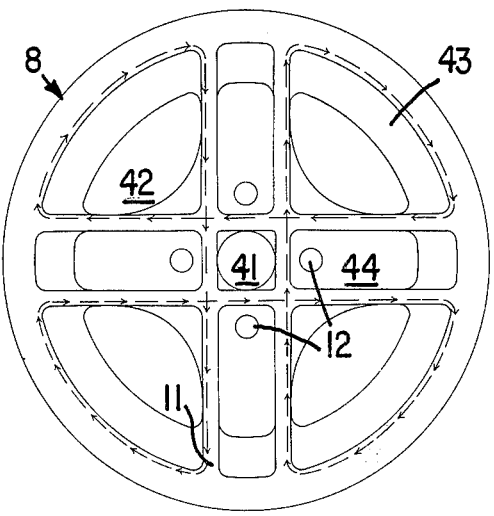
Figure 9:
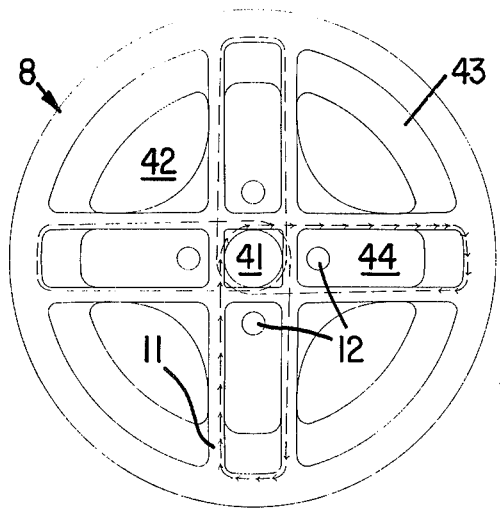
Figure 10:
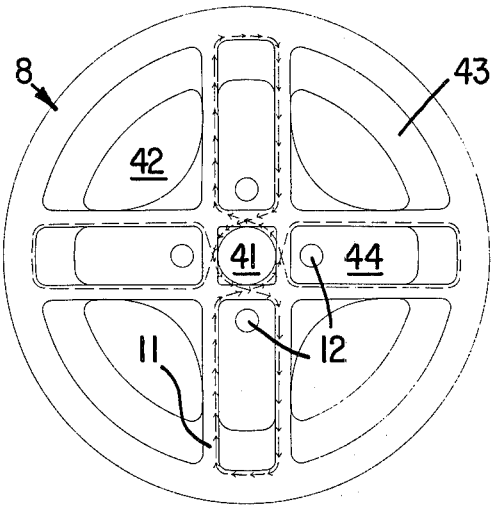

With reference to FIGS. 4 and 7–10, the filament winding procedure begins at the flange defining channels 11 of the front negative mold 8. In FIG. 7, filament is continuously wound through the entire length of each channel 11, around the spacing projections 44. In FIG. 8, the filament passes through the channel 11 and around the adjacent quadrant section 43 before entering the next channel 11. The winding patterns of FIG. 7 and FIG. 8 differ in that the former reinforces the internal wall of the resulting flanges 2, whereas the latter reinforces the external flange wall. In FIGS. 9 and 10, filament is wound around the centerpost 41 as well as around the individual spacing projections 44. This represents one winding sequence, after which resin is brushed over the wound filaments. The winding sequence is repeated, followed by the application of resin, to the extent necessary to build up the flanges 2 as shown in FIG. 1.

It is also possible to apply resin after several layers have been wound in place, rather than alternately between layers. The time at which resin should be applied depends on the thickness of the filament, the resin used, its viscosity and cure rate, and the rate at which the resin is able to penetrate the fibers. Alternately, the filament can be passed through a resin bath immediately before being wound onto the mold.

Whatever the method of introducing resin, it is important that all air spaces and voids be completely eliminated from the filament matrix in order to achieve maximum strength. Penetration of the resin is generally enhanced by stippling with a resin brush.

After all flange winding is completed, the flange-rim interface 18 is sealed with glass-mat and resin. With this area sealed, the resin coming from the channels 11 will fill all voids, and the resin will not leak out onto the rim area. It is also possible to fill the interface area with filament tape, or to inject resin into the interface area after the entire wheel has been made.

Figure 16:
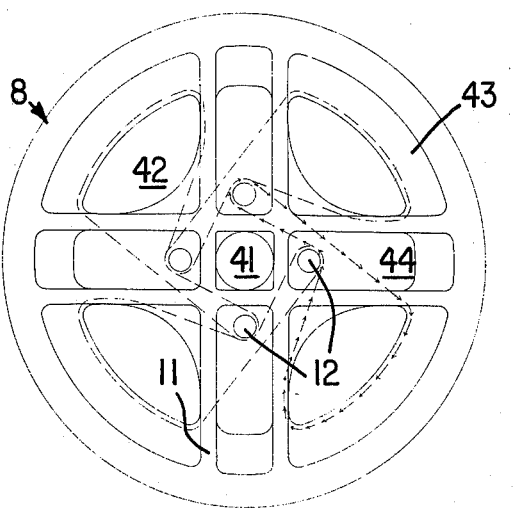
Figure 17:
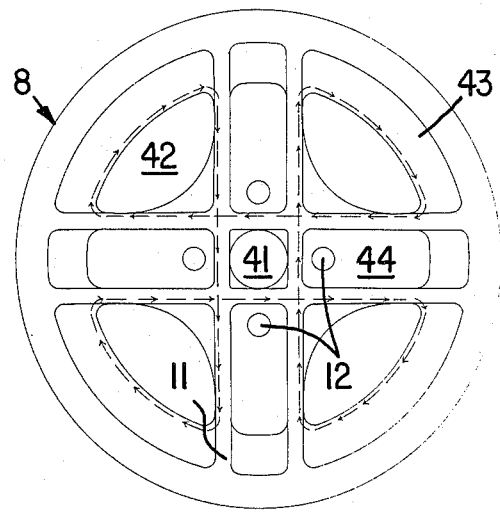
Figure 18:
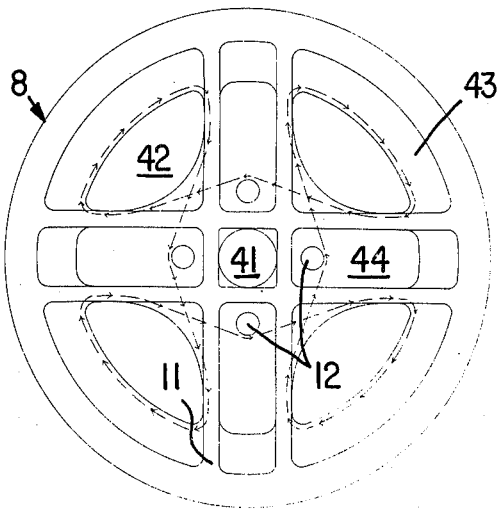
Figure 19:
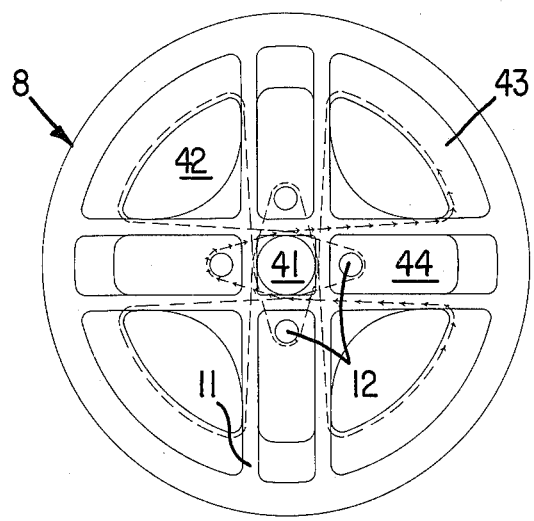
Figure 20:
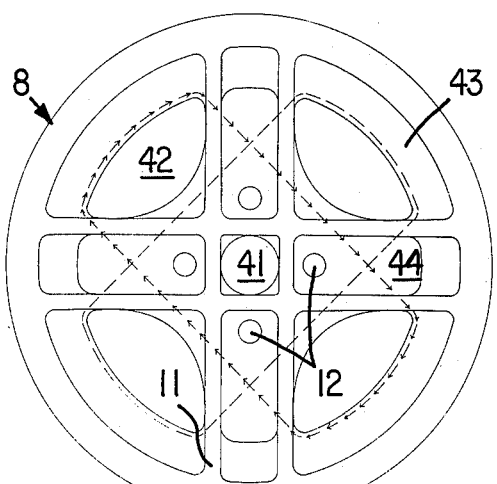
Figure 21:
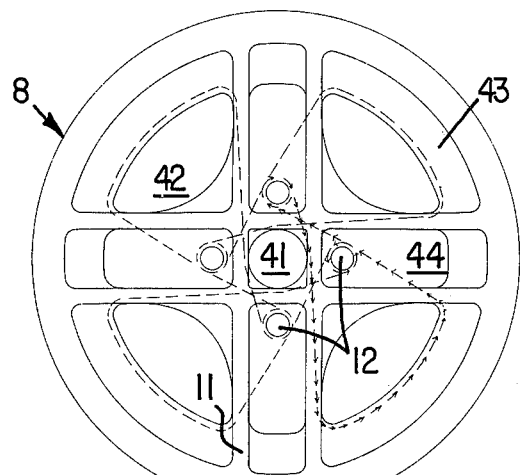
Figure 22:
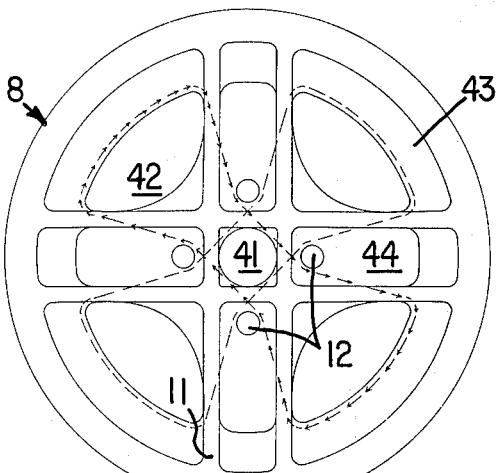
Figure 23:
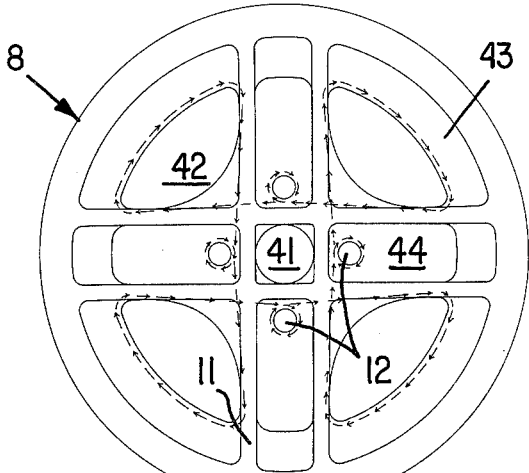
Figure 24:
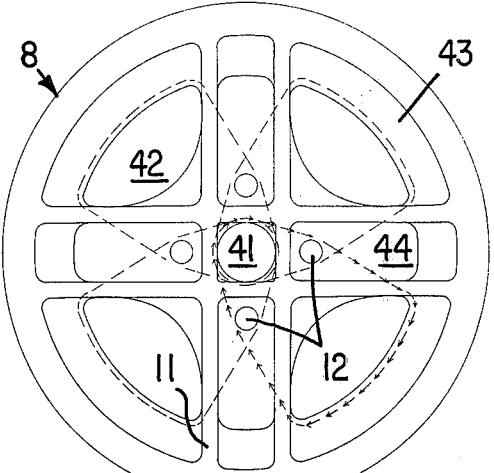

Winding of the web 1 follows formation of the flanges 2, and is done in accordance with the winding patterns of FIGS. 11–25. In FIGS. 11–14, filament is continuously wound in various patterns relative to the lug bolt hole winding plugs 12 and centerpost 41. In FIGS. 15–25, the filament is wound between the irregular porjections 42 and lug bolt hole winding plugs 12 in various patterns. The winding pattern of FIGS. 16 and 21 are unidirectional and should be reversed for maximum strength.

As in winding the flange area, the number of filament layers wound in place before resin application depends on the physical properties of the filament and resin used. As suggested above, it is possible to pass the filament through a resin bath prior to winding, rather than winding dry and adding resin later.

Figure 26:
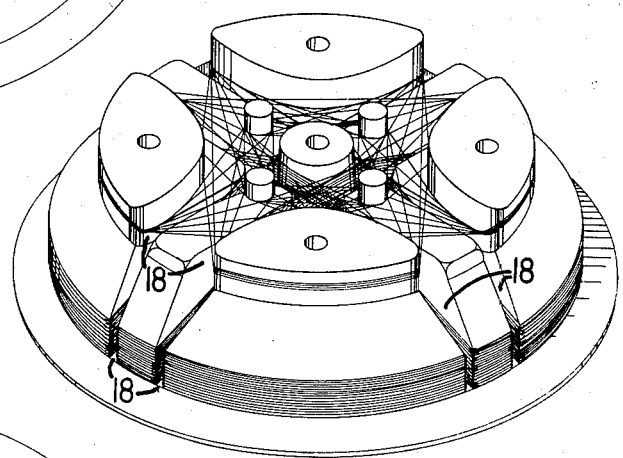
FIG. 26 is the same view as FIG. 4 with one series of winding patterns of FIGS. 7–25 completed.
Figure 27:
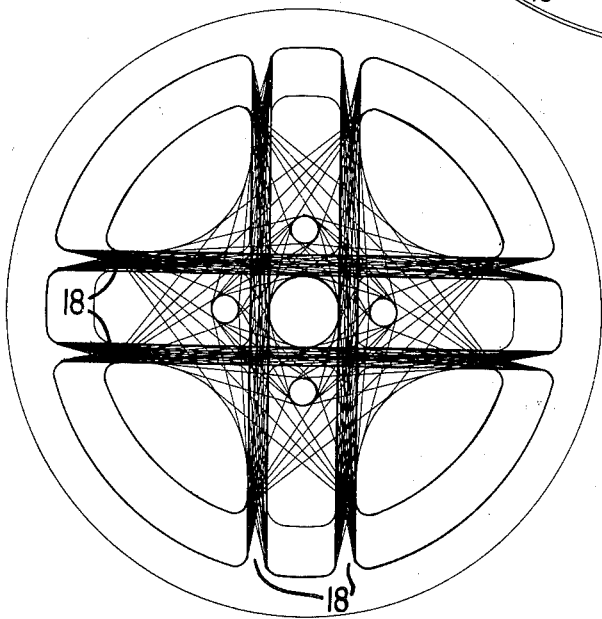
FIG. 27 is a view of FIG. 26 taken in side elevation.

FIG. 26 and 27 each depicts one sequence or layer of filament winding both for the flange 2 and the web 1.

When winding of the web 1 is complete, the interface 18 between web and rim is sealed with glass-mat and resin, or by way of the alternate methods described in connection with the flange-rim interface. After these interface areas have been sealed and set, additional resin may be poured over the web filaments to fill all voids. Following formation of the flanges 2 and web 1, the rear negative mold 9 is secured to the front negative mold 8 by means of fastening bolts 6, and the reinforcing disc 14 is fastened in a similar manner. A rotatable shaft 7 is inserted axially through the assmbled unit, and set screws 19 of the respective spring flanges 17 are tightened down so that the unit rotates with the shaft 7. The shaft is mounted for rotation in any convenient stand, preferably in a horizontal position.

Additional rim winding equipment comprises a pair of rim winding discs 20, each of which includes a plurality of winding pegs which extend radially from its outer circumferential surface. The number of winding pegs 22 may vary in accordance with the type of filament matrix desired for fabrication of the rim. In the preferred embodiment, the winding pegs 22 are equidistantly spaced around the circumference of the winding discs 20, and each is disposed on a radius of the disc 20. It will be appreciated, however, that various peg configurations can be used, as can other types of structure capable of receiving and retaining a filament length.

Each of the winding disc 20 further comprises a spring flange 45 which is similar to the spring flanges 17 and secured to the disc 20 in the same manner. Each of the spring flanges 45 includes a set screw 24, enabling the winding disc 20 to be rotatably secured to the shaft 7.

As will be appreciated from FIGS. 5A and 5B, winding discs 20 are separated from the negative mold assembly by coil springs 21, which are disposed between the respective spring flanges 17, 45. The winding discs 20 are initially secured to the shaft 7 by means of the set screws 24.

Figure 6:
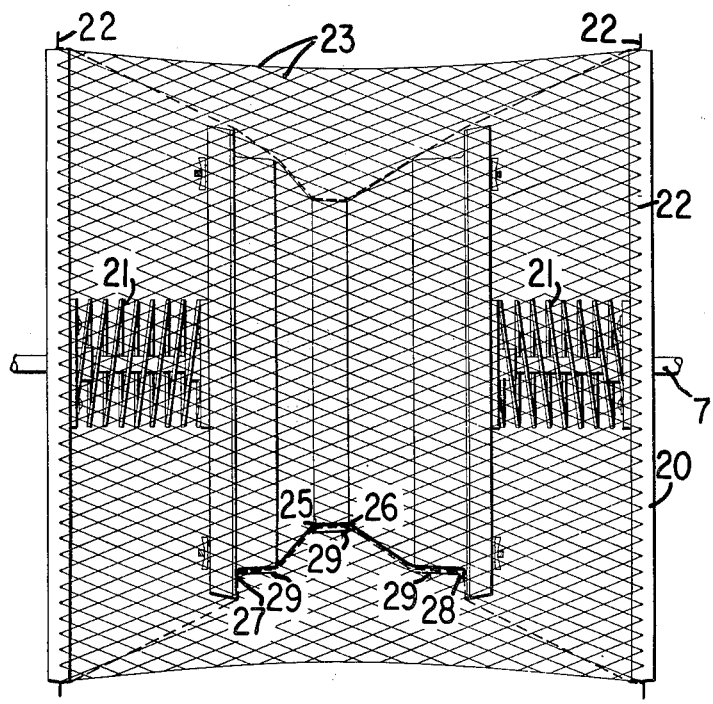
FIG. 6 is a view in side elevation of the assembled rim winding equipment with a sheath tube of filament continuously wound thereon.

With the rim winding equipment fully assembled, filament is continuously wound diagonally (i.e., each filament length is disposed at an angle relative to the wheel axis for rotation as evidenced by the reference numeral 36 in FIG. 1) to produce a diagonally woven sheath tube 23 of filament lengths which overlap in crisscross fashion. The sheath tube 23 can be wound or weaved by several different methods each of which is entirely suitable. For example, the filaments may initially be wound parallel to each other (although at an angle relative to the wheel axis of rotation) until the entire circumference of each of the winding discs 20 has been covered. Then a second series of parallel, diagonal filaments can be wound around the pegs 22 in the opposite direction to obtain the desired crisscross configuration. Alternatively, it is possible to begin the sheath tube winding operation at one peg point of one of the winding discs 20, to rotate the winding unit a predetermined number of degrees which permits the filament to be drawn diagonally from the first point to a second point on the opposite winding disc 20, by rotating a winding unit the same number of degrees and in the same direction and drawing the filament from the second point to a third point on the first winding disc 20, and so forth. This back and forth procedure produces a zigzag pattern of the filament which, upon development, begins to traverse or cross itself and ends with completion of the sheath tube 23 as shown in FIGS. 5A and 5B and 6.

After one diagonally woven sheath tube has been completed, the set screws 24 of spring flanges 45 are released, which permits axial movement of the rim winding discs 20 relative to the shaft 7, but subject to the biasing force of springs 21. The sheath tube 23 is drawn down over the negative mold unit by wrapping filament circumferentially around the sheath tube at several points, cinching the filament down onto the negative molds and trying it in place. Preferably, such points are at the juncture of the smallest cylindrical surface of the rim and the respective angularly divergent surfaces, as represented by the numerals 25 and 26; and at the extreme outer edge of the rim surface at the bead flange defining areas, as represented by the numerals 27, 28. The cinching down of filament in these four circumferential regions causes the sheath tube 23 to conform to the negative mold surface, thus obtaining the desired rim configuration. This is followed by the winding of circumferential bands of filament tape (a preformed layer of several filaments extending longitudinally) between the points 25 and 26, and each of the bead regions, as represented by the numeral 29. The sheath tube 23, circumferentially wound filament lengths 25-27 and circumferential bands 29 of filament tape are now impregnated with resin, thus completing one rim winding cycle.

As suggested above, it is possible to pass the filament and filament tape through a resin bath prior to formation of the sheath tube matrix and the circumferential conformance winding. It is also possible to weave the diagonal sheath tube in a dry state, to cause it to conform to the negative mold by an external mold or clamp, and to introduce resin to the wound filaments by pressure or vacuum.

The number of sheath tube cycles necessary to finish the rim is determined by the structural requirements of the wheel, and the size of the filaments used. Each successive sheath tube 23 is preferably weaved at a different angle relative to the wheel axis of rotation, so that the filaments of each sheath tube are angularly disposed relative to filaments of adjacent sheath tubes. Such construction creats an overlapping, interlocking filament system of maximum strength.

When the desired rim thickness has been achieved through placement of a plurality of sheath tube layers, the bead-flange area 5-B (FIG. 3) is reinforced by the winding of additional circumferential layers of filament tape. It is also possible to reinforce the bead flange 5-B by winding filament circumferentially between the vertical face of the negative mold and a second vertical face spaced from the first, as provided by an accessory mold or the like. It is desirable that sufficient filament or filament tape be used in order for the bead 5-A and bead-flange 5-B (FIG. 3) to be machined down to proper size.

The initial step in removing the wheel after the matrix has cured is to release the outboard filaments (i.e., those filaments disposed between the negative mold unit and the winding discs 20), such as by cutting. The rim winding discs 20 are then removed from the shaft 7 by loosening of the set screws 24, and the negative mold halves 8, 9 are pulled apart. If separation is difficult, the hollow areas of the mold halves 8, 9 can be filled with a cooling agent, thus causing the molds to contract and permitting their separation.

Machining of the wheel follows standard machining procedures. The lug bolt holes 34 are created by drilling out the winding plugs 12. Metal inserts 31 (FIGS. 1-3) may be pressed into place to increase compressive strength in this area. (It is also possible to place the metal inserts over the winding plugs 12 prior to the winding of filament.) The wheel is finished by applying an additional resin coat to all machined areas, thus sealing and protecting the entire wheel from the elements.

The resulting wheel structure is a volumetric, solid configuration, the inside of which comprises a myriad of straight line filaments which resist all stresses and tension. The size, position and interrelationship of the web, flanges and rim create a form-resistant structure, with the continuous filaments filling this structure to create an interwoven, interlocking monolith.

The two parallel sets of flanges 2 cross and intersect at the center to permit a continuous flow of forces across the entire system. This permits the placing of filaments in continuous strands across the entire unit. The interlocking filaments placed around the hub opening reinforce the opening and resist the circumferential stress concentrations which the opening 32 creates. As shown in FIG. 3, the flanges 2 extend from the hub 30 to the front internal rim area 3 of the rim portion R, so that continuous filament strands (FIGS. 7-10) can interlock with the rim bead area 5-A. This stiffens the rim portion R by transmitting impact loads from the bead area 5-A into the flange 2-web 1 system. The interlocking filaments also reduced shear action at the interface 18 between the rim portion R and flanges 2.

The web 1 is parallel to the torsional forces of acceleration and braking imposed on the wheel during operation. The web 1 is also parallel to static straight line loads resulting from weight of the vehicle. The web is of sufficient width between the flange 2 to permit filaments to travel diagonally (i.e., transverse to radii of the wheel) into the rim (see, for example, FIGS. 20, 25 and 27), thus resisting torsional forces imposed on the wheel in tension. These diagonally disposed filaments also greatly reduce shear action at the interface of the web 1 and rim portion R. The filet portion 1-A of the web permits a smooth, continuous, rounded path for filaments in that region. The web 1 is strengthened and prevented from deflecting out of its plane by perpendicular, flanges laterally projecting 2. The lug bolt holes 34 are strengthened by their proximity to the perpendicular, laterally projecting flanges 2.

The stiffness of the rim portion R and its resistance to deflection are enhanced by its physical shape, which consists of a system of intersecting planes (as represented by the connected circumferential rim sections in FIG. 3), and by its interlocking layers of sheath tubes 23 and circumferential filament bands 29. The intersecting planes resist deflection through folded plate and diaphragm action, and the filament system of sheath tubes 23 and filament bands 29 prevents plane and interplane separation, as well as resists surface extension through tension. The diagonally disposed, crisscross filaments of each sheath tube resist all braking and accelerating torsional forces in tension. As pointed out above, each sheath tube 23 is fabricated at a different angle relative to adjacent sheath tubes 23 to insure an overlapping interlocking system that fills all voids and eliminates stress concentrations.

The purpose of the flange winding patterns of FIGS. 7–10 is to tie the rim portion R together from edge to edge, permitting the unbroken transfer of forces across the wheel; to reduce shear action at the interface of the flanges 2 and rim portion R; to interlock and weave the flanges 2 together at their central crossing; and to reinforce the hub opening 32.

Figure 11:
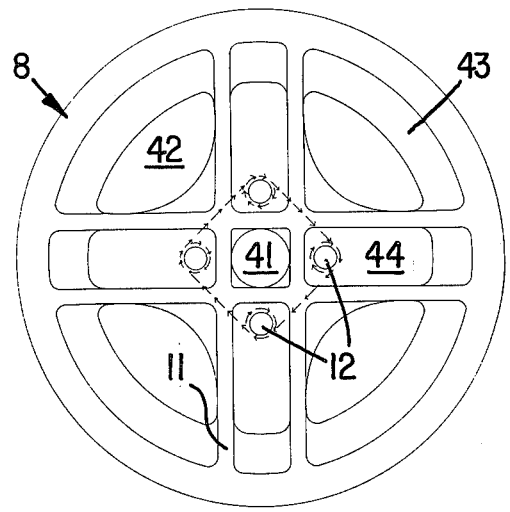
FIGS. 11–14 are diagrammatic views in side elevation of the front negative mold section, each showing a different pattern of continuous filament winding to define lug bolt holes.
Figure 12:
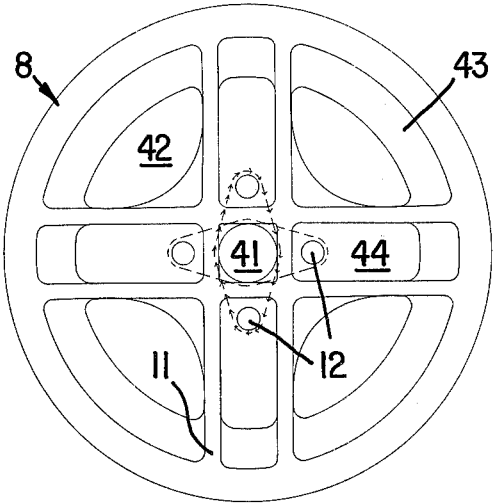
Figure 13:
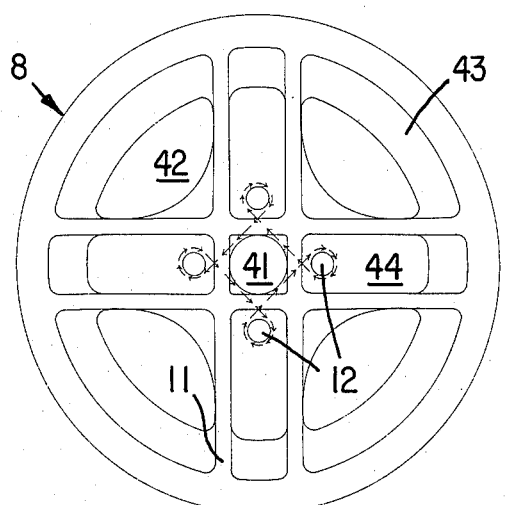
Figure 14:
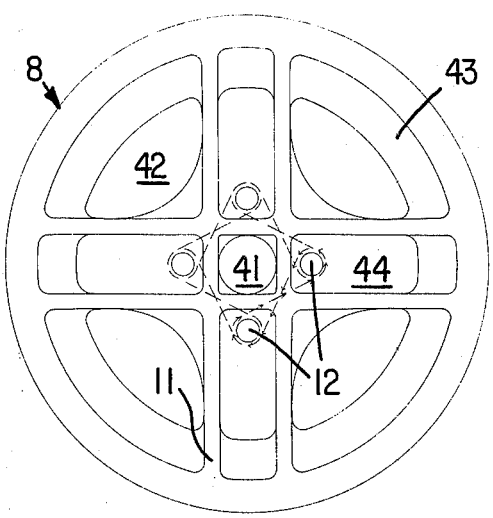
Figure 15:
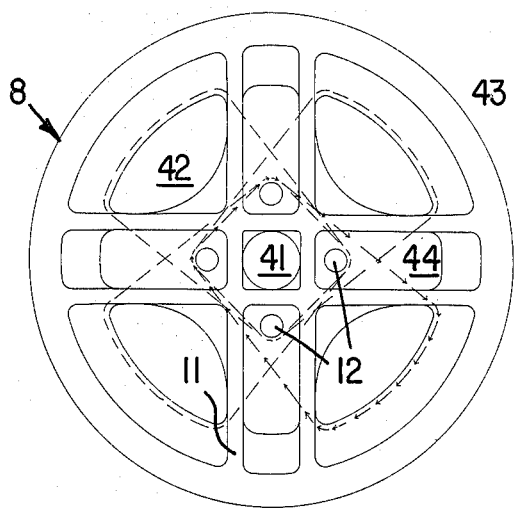
FIGS. 15–25 are diagrammatic views in side elevation of the front negative mold section, each showing a winding pattern of continuous filament to define the wheel web.
Figure 25:
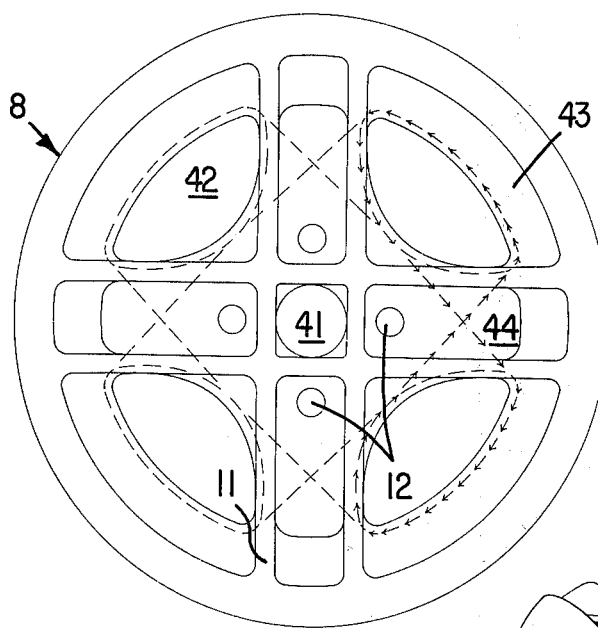

The web winding patterns as shown in FIGS. 11, 25 cause filament to be disposed in a manner so that all accelerating and braking torques imposed on the moving wheel, and all static loads imposed on the wheel by reason of vehicle weight, are resisted in tension. The web winding patterns also tie the lug bolt holes 34 together into one unit (FIGS. 11–14), reinforce the lug bolt holes 34 by resisting fractures along their respective circumferences, reinforce the area around the hub opening 32, tie the lug bolt holes 34 directly into the rim portion R through straight line, diagonal filaments (FIGS. 15, 16, 18, 20, 21, and 24), and tie the web 1 and rim portion R into one unit, thus reducing shear action at the web-rim interface. As pointed out above, the winding patterns are done in sequence, and the entire sequence is repeated as determined by the structural requirements of the particular wheel. This insures an overlapping, interlocking unit that resists stress through the entire system, and eliminates stress concentrations and voids.

Winding of the rim portion R of this embodiment is in two parts: the diagonally woven sheath tubes 23 and the circumferential bands of filament tape 29. The filaments of the sheath tubes 23 are diagonally disposed; i.e., disposed an an angle relative to the wheel axis of rotation (as evidenced by the reference numeral 36 in FIG. 1) in order for braking and accelerating torques to be resisted in tension. The filaments of the sheath tubes 23 also tie the rim portion R together laterally, thus preventing separation of the connected rim sections. The circumferential bands 29, which are placed over each sheath tube 23, bind the sheath tube 23 in place, strengthen the bead area 5-A and bead flange 5-B, and resist deflection caused by local extension.

The filament used in winding the wheel can be a combination of main structural filaments, and redundant backup filaments. The main structural filaments should give the highest strength to weight ratio, and also the highest stiffness to weight ratio. The redundant filament should have a greater tensil elongation, making it less brittle, and thus acting to hold the wheel together even if the main structural filaments fracture under extreme stress.

The resin used can be of the self-extinguishing, flame retardant type. In addition to having a high compressive strength, it must be compatible with the type of filaments used.

Figure 28:
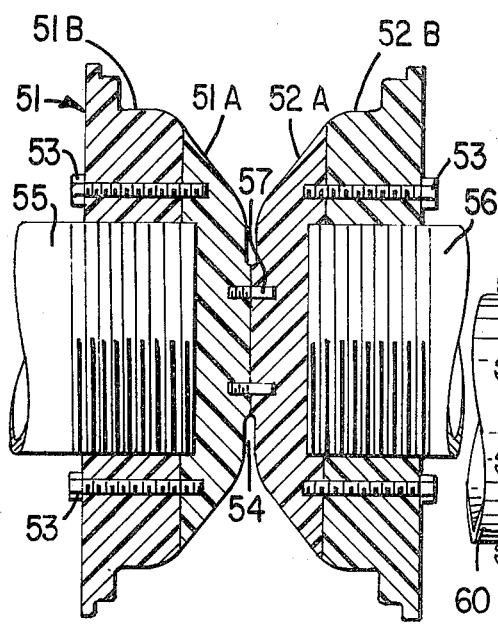
FIG. 28 is a sectional view of an alternative rim winding multiple section negative mold in mounted position, portions thereof shown in full.
Figure 29:
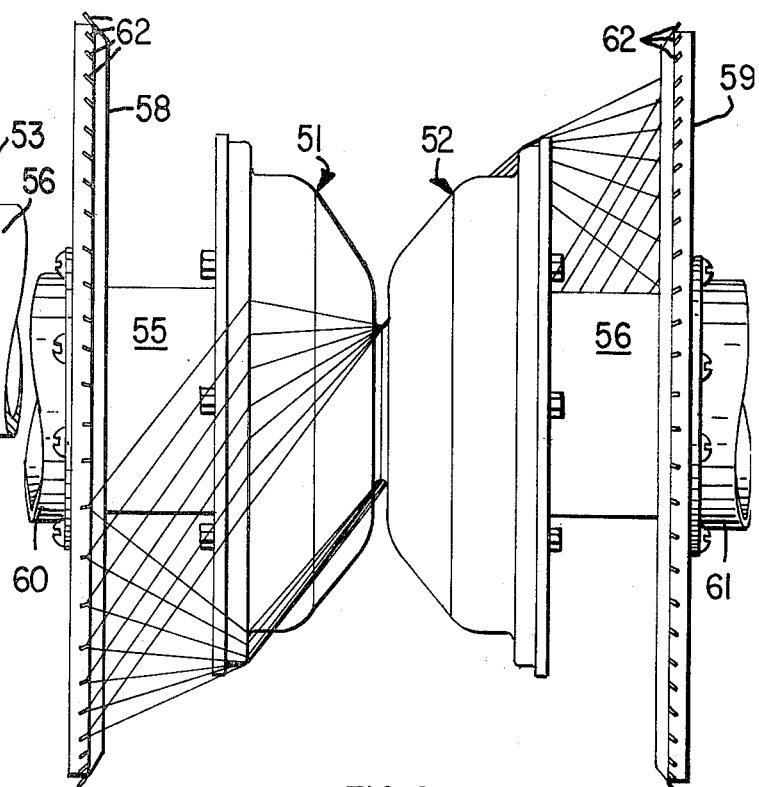
FIG. 29 is a view in side elevation of the alternative rim winding negative mold and associated rim winding equipment, with filament partially wound thereon.
Figure 30:
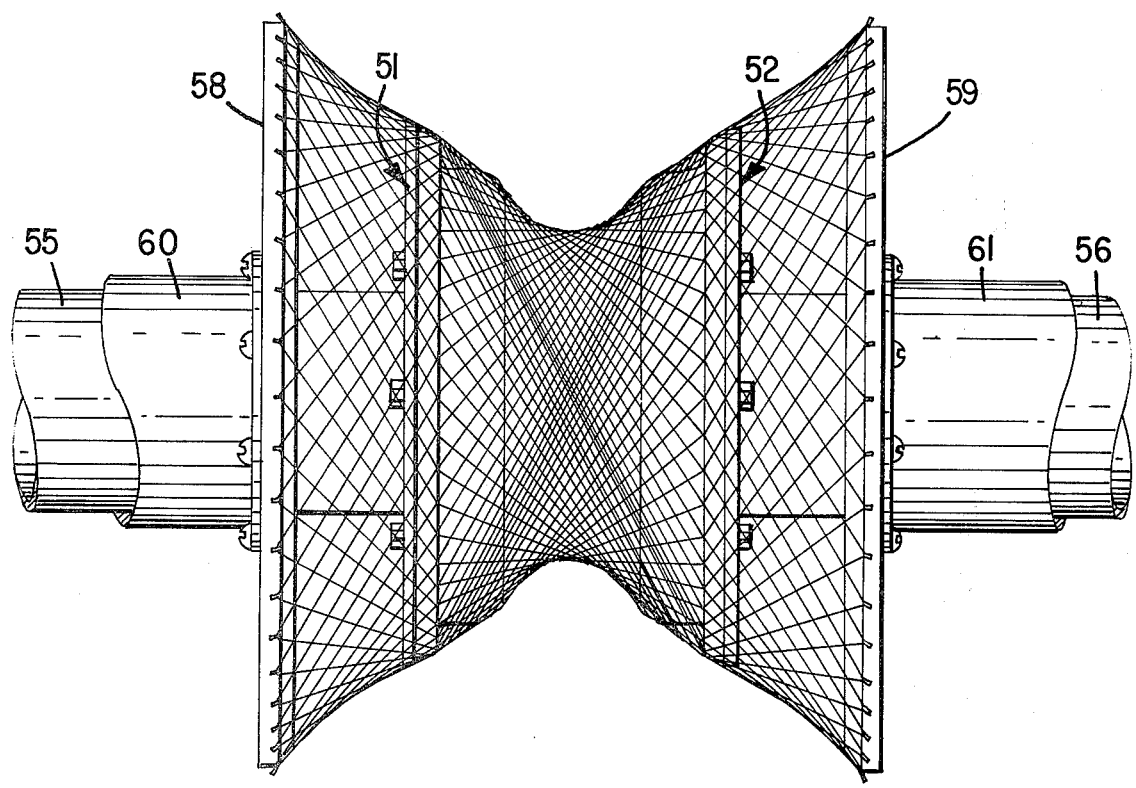
FIG. 30 is the view of FIG. 29 with one completed layer of filament continuously wound thereon.

FIGS. 28–30 disclose alternative apparatus capable of use in fabricating a wheel with a single winding process.

With specific reference to FIG. 28, the alternative apparatus comprises a front negative mold half 51 and a rear negative mold half 52 which, for purposes of this embodiment, are identical in configuration. Front negative mold half 51 is in turn broken down into negative mold sections 51B and 51A, which are separably secured by a plurality of bolts 53. Similarly, rear negative mold half 52 is broken down into mold sections 52A, B which are secured together by bolts 53.

The respective mold sections 51A, B and 52A, B are interchangeable, thus enabling the fabrication of wheels of various configurations with this basic fabricating equipment.

The rim configuration defined by the front and rear negative mold halves 51, 52 is generally similar to that defined by the negative mold half 8, 9 of the first embodiment. There is one significant structural difference, however, that lends itself to fabrication of the entire wheel, including both the rim portion and hub portion, in a single winding process. Such structural difference resides in the annular recess 54 which is defined by and extends deeply between the respective mold sections 51A, 52A. The proper winding and buildup of filament, impregnated with resin, in the recess 54 itself forms the wheel hub, as will be subsequently described in detail.

With continued reference to FIG. 28, each of the mold sections 51A, B is internally threaded for screw-type mounting on an externally threaded tube 55 of substantial diameter. The mold sections 52A, B are similarly mounted on an externally threaded tube 56. The threaded tubes 55, 56 are carried by apparatus, not shown, which is capable of rotating the tubes 55, 56, or individually for registration purposes; and is also capable of effecting relative axial movement between the negative mold halves 51, 52 to bring them together before the winding process begins, and to separate them after the wheel has been fabricated. The mold halves 51, 52 are held in registration and prevented from relative rotational movement by four alignment pins 57 (only two of which are shown in FIG. 28), which are threadably carried by the mold section 51A and inserted into appropriately placed registration openings in mold section 52A. It is important that the negative mold halves 51, 52 be prevented from relative rotation during the winding process in order to maintain symmetry and distribution of the filaments after they have been wound in place.

With additional reference to FIGS. 29 and 30, the alternative winding apparatus further comprises winding discs 58, 59 which are structurally similar to the winding discs 20, being greater in diameter than the negative mold halves 51, 52. The winding discs 58, 59 are respectively carried by mounting tubes 60, 61, which are greater in diameter than the tubes 55, 56, and concentric therewith to permit relative telescopic movement between the two. The mounting tubes 60, 61 are controllable in the same manner as the tubes 55, 56; i.e., they are rotatable as a unit with the negative mold halves 51, 52, individually rotatable, and capable of axial movement relative to the associated negative mold half.

Each of the winding discs 58, 59 includes a plurality of winding pins 62 which, preferably, are equidistantly spaced along the circumference of the winding disc. However, as distinguished from the winding pegs 22, they are disposed at an angle with respect to the plane of the winding disc, projecting away from the negative mold halves 51. 52. This angular disposition of the winding pins 62 insures that the continuously wound filament will not slip off during the winding process.

The winding process with respect to the apparatus disclosed in FIGS. 28–30 also varies somewhat the process described in connection with the first embodiment. With respect to the first embodiment, it will be recalled that filament is continuously wound in a manner to form a sheath-tube of diagonally disposed, crisscross filaments which encompasses or surrounds the negative mold, and which is subsequently drawn down to the negative mold in conformance therewith. With respect to the apparatus of FIGS. 28–30, the overall winding apparatus (including the negative mold halves 51, 52 and winding discs 58, 59 is rotated sufficiently to cause filament extending from a winding pin 62 on one of the winding discs 58, 59 to engage and at least partially conform to the negative mold halves 51, 52 before reaching a winding pin 62 on the opposite winding disc. The degree of rotation necessary to accomplish engagement of the filament with the mold depends on a number of criteria among which are the specific configuration of the negative mold (both rim and hub defining portions), size of the winding discs relative to the negative mold, and the axial spacing of the winding discs relative to the negative mold. In other words, the amount of rotation necessary varies with each wheel fabrication, and the inventive method is therefore not limited in this respect.

FIG. 29 discloses the first few filament lengths wound in place. For maximum efficiency, winding of the filament lengths is continuous (i.e., filament is continuously supplied from a spool or other source) and with rotation of the winding unit in a single direction, so that filament passes back and forth between the winding discs 58, 59 in zig-zag fashion. Generally, it is also preferable that the amount of rotation for a single filament length as it passes from one winding disc to the other be greater during the initial winding in order for the annular recess 54 to fill more rapidly. If the hub defining recess 54 is particularly deep, it may be desirable to rotate the winding unit more than one complete revolution.

As described in connection with the first embodiment, it is possible to introduce resin at periodic intervals (e.g., between completed filament layers), to pass the filament through a resin bath before winding it on the negative mold, or to "dry" wind the negative mold completely, externally mold the filament matrix, and introduce the resin thereafter.

FIG. 30 discloses one complete layer of filament lengths which have been continuously wound on the negative mold halves 51, 52. In this context, a layer is defined as the amount of filament winding necessary to circumferentially encompass the negative mold, preferably in a symmetrical manner. As discussed in conjunction with the first embodiment, the number of filament layers necessary in the fabrication of a wheel depend on the structural configuration of the wheel itself as well as its manner of intended operation. Also as before, the filaments of one layer are preferably angularly disposed relative to the filaments of adjacent layers to attain maximum wheel strength. This is, of course, accomplished by varying the degree of rotation of the winding unit from one filament layer to the next.

After a sufficient number of filament layers have been wound on the negative mold, it is necessary to cause conformance of the filaments to the negative mold in the step portions of the bead area. This is accomplished by initially moving the mounting tubes 60, 61 axially inward to reduce tension on the individual filaments, and, as before, by circumferentially winding filament or filament tape in the stepped areas, or through the use of an external mold which complements the negative mold to effect filament conformance.

Fabrication of a wheel on the winding apparatus of FIGS. 28–30 is otherwise the same as that described in connection with the first embodiment.

It will be appreciated that there is no provision for the formation of lug bolt holes during the winding process on the apparatus disclosed in FIGS. 28–30. For wheel structures fabricated in this manner, lug bolt holes are drilled through the hub portion after the wheel has been removed from the fabricating apparatus.

Figure 31:
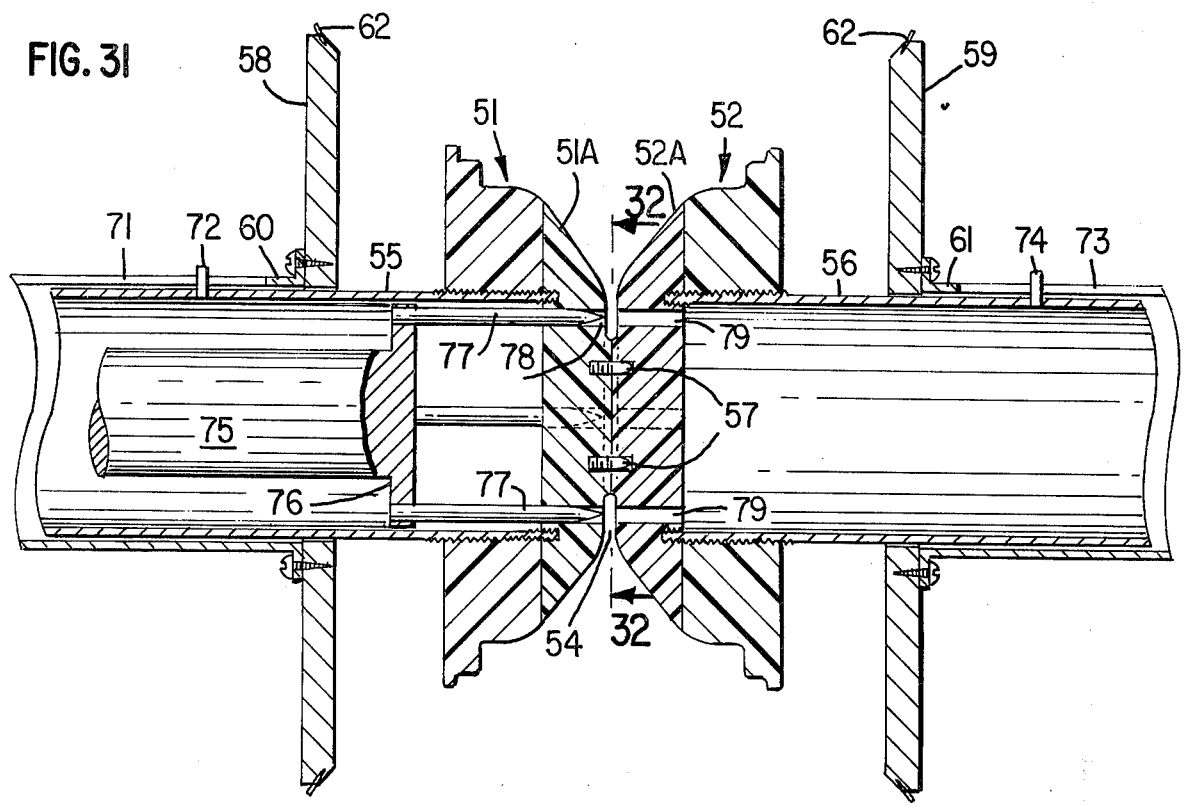
FIG. 31 is a sectional view of rim winding apparatus similar to that of FIGS. 28 and 29 but including an additional modification thereto.
Figure 32:
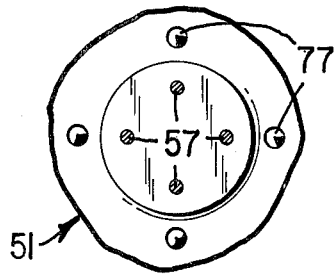
FIG. 32 is a fragmentary sectional view taken along the line 32—32 of FIG. 31.

FIGS. 31 and 32 disclose winding apparatus similar to that disclosed in FIGS. 28–30, but modified through the inclusion of structure for creating lug bolt openings after the filament matrix has been formed, prior to its curing into a solidified mass. In the winding apparatus in FIGS. 31–34, the reference numerals of FIGS. 28–30 have been retained with respect to like structure, and new reference numerals represent the additional and modified structure.

With specific reference to FIG. 31, the respective mold sections 51A, 51B and 52A, B are again threadably mounted on the tubes 55, 56 and the winding discs 58, 59 are respectively mounted on winding tubes 60, 61. In order to prevent relative rotation between the mounting disc 58 and negative mold half 51, however, an elongated axial slot 71 is formed in the mounting tube 60, and an alignment pin 72 projects upwardly from the tube 55 through the slot 71. This structural configuration permits relative axial movement between the disc 58 and mold half 51, but precludes relative rotation therebetween.

Figure 33:
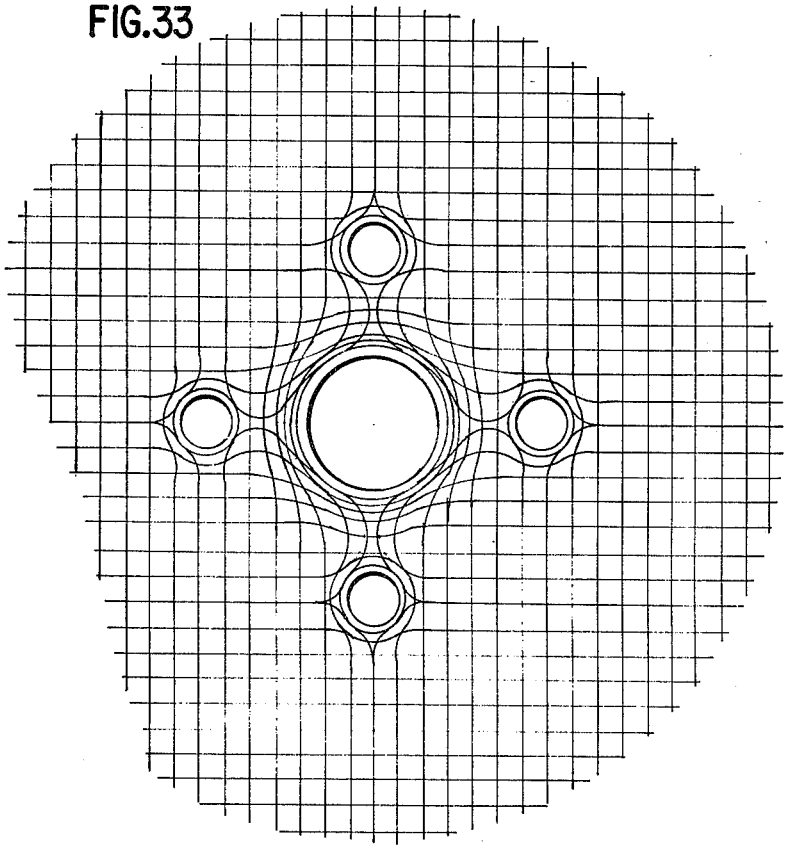
FIG. 33 is a fragmentary diagrammatic representation of a continuously wound filament matrix as viewed in end plan from between the negative mold sections.

The winding apparatus of FIG. 31 further comprises another axially movable member taking the form of a shaft 75 disposed internally of the threaded tube 55 and coaxial therewith. Shaft 75 terminates in a piston-like head 76 which carries four axially disposed spike members 77 near its outer peripheral edge (see also FIG. 32). The spike members 77 are disposed in axial alignment with a first set of bores 78 which extend through the mold section 51A, and a second set of bores 79 in mold section 52A. The bores 78, 79 are disposed to traverse the annular recess 54, thus permitting the axial moving spike members 77 to pierce and project through the filament matrix which has previously been wound in the annular recess 54. FIG. 33 is a diagrammatic representation of the spike members 77 projecting through a previously formed filament matrix. For purposes of clarity, the matrix of FIG. 33 is shown diagrammatically, and only partially formed. It is to be emphasized that the projection of spike members 77 through the filament matrix pushes the individual filaments aside (rather than cutting them) to concentrate the filaments in the lug bolt hole areas, thus strengthening these openings against circumferential fraction and resisting the compressive forces generated by the tightening of lug bolts.

The method of wheel fabrication using the apparatus of FIG. 31 is similar to that of the embodiments earlier disclosed, with the exception that, with the filament matrix fully wound, the shaft 75 is axially moved to cause the spike members 77 to pierce and project through the matrix to define the lug hole openings. It is preferred that projection of the spike members 77 be effected after the release of filament tension, through inward axial movement of the mounting tubes 60, 61, but before the filament matrix is conformed to the negative mold. As discussed above, such matrix conformance is accomplished either by the circumferential winding of filament tape in the stepped areas of the mold, or through the use of an external complementing mold.

After the resin impregnated filament matrix has cured, shaft 75 is retracted to withdraw the spike members 77. Removal of the fabricated wheel and other finishing steps are otherwise the same as with the embodiments earlier described.

Figure 34:
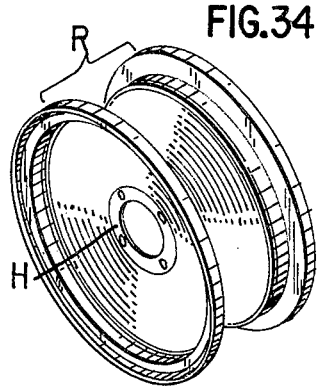
FIG. 34 is a perspective view of a wheel produced from the apparatus of FIG. 31.

The wheel structure resulting from fabrication on the winding apparatus of FIGS. 28–30 and 31–32 is shown in the perspective view of FIG. 34. As shown and described, the wheel does not include the intersecting flanges 2 of the wheel of the first embodiment. If structurally or asthetically desirable, it is possible to incorporate the flange defining channels 11 of the front negative mold half 8, or similar structure, into either of the negative mold halves 51, 52 of the second and third winding apparatus embodiments.

I claim:

1. A wheel for pneumatic tires and the like, comprising:
   a. a fiber reinforced plastic central hub portion adapted to be rotatably mounted;
   b. and a rim formed to the hub portion for receiving a tire, the rim having first and second circumferential, tire engaging bead regions on opposite sides of the rim, the rim comprising a plurality of resin encased filament lengths extending continuously from one bead region over the hub portion to the opposite bead region, whereby torsional forces exerted on the rim are resisted in tension by the filament lengths.

2. The wheel defined by claim 1, wherein the resin encased filament lengths are disposed in a plurality of layers.

3. The wheel defined by claim 2, wherein the filament lengths of one layer are angularly disposed with respect to filament lengths of the other layers.

4. The wheel defined by claim 1, wherein the rim further comprises resin encased filament circumferentially wound in alternate layers over said filament lengths in each of the bead regions.

5. The wheel defined by claim 4, wherein said circumferentially wound filament comprises unidirectional filament tape.

6. The wheel defined in claim 1, wherein the filament lengths extend diagonally between opposite side bead regions.

7. The wheel defined in claim 1, wherein said filament lengths form a radially extending bead flange at the outer edge of each rim, said bead portions comprising an axially extending area adjacent each bead flange.

8. The wheel defined by claim 7, wherein the rim further comprises resin encased filament circumferentially wound over the filaments in a region intermediate the bead regions.

9. The wheel defined by claim 8, wherein the circumferentially wound filament and the filament lengths extending between bead regions are arranged in alternate layers.

10. The wheel defined by claim 8, wherein the circumferentially would filament comprises unidirectional filament tape.

11. The wheel defined in claim 1, wherein said hub portion includes an axial mounting opening and comprises a matrix of overlapping, resin encased continuous film lengths extending around said axial opening.

12. A wheel for pneumatic tires and the like, comprising:
   a. a fiber reinforced plastic central hub portion adapted to be rotatably mounted;
   b. and a rim formed to the hub portion for receiving a tire, the rim having a circumferential central region and circumferential tire engaging bead regions on each side thereof, the rim comprising a plurality of resin encased continuous filament lengths extending from the cenral region to opposite side bead regions, said filaments overlapping in crisscross fashion, whereby torsional forces exerted on the rim are resisted in tension by the filament lengths.

13. A wheel for pneumatic tires and the like, comprising:
   a. a fiber reinforced plastic rim portion constructed to receive and carry a tire;
   b. a central hub portion formed to the rim portion and including an axial mounting opening, the hub portion comprising a matrix of overlapping, resin encased continuous filament lengths extending around said axial opening and outward to said rim portion in essentially straight lines, whereby torsional forces exerted on the wheel are resisted in tension by the filaments.

14. The wheel defined by claim 13, wherein the resin encased filament lengths extend tangentially outward from the axial opening.

15. The wheel defined by claim 13, wherein the hub portion includes a plurality of equiangularly spaced openings for receiving bolts or the like, said resin encased filament lengths extending around each bolt opening.

16. The wheel defined by claim 15, wherein the hub portion further comprises lengths of resin encased filament each of which encircles one of said mounting openings and extends tangentially to another mounting opening.

17. The wheel defined by claim 15, wherein at least some of said resin encased filament lengths encircle the mounting openings and extend tangentially therefrom to the rim portion.

18. The wheel defined by claim 13, wherein the hub portion includes a plurality of equiangularly spaced mounting openings constructed to receive mounting bolts or the like, said resin encased filament lengths extending outward from the axial hub opening and the bolt mounting openings to the rim portion in essentially straight lines.

19. The wheel defined by claim 13, wherein said overlapping, resin encased filament lengths extend in an essentially straight line from one side of the rim portion to the other side of the rim portion.

20. The wheel defined by claim 19, wherein at least some of said plurality of resin encased filament lengths are angularly disposed to others of said plurality of resin encased filament lengths.

21. The wheel defined by claim 19, further including circumferentially wound resin encased filament lengths on the rim portion.

22. The wheel defined by claim 13, and further comprising a plurality of strengthening flanges each of which extends longitudinally from a central region of the hub portion to the rim portion and projects laterally from the hub portion, the strengthening flanges comprising a plurality of overlapping, resin encased filament lengths.

23. The wheel defined by claim 22, wherein the strengthening flanges extend longitudinally from said central region to the rim portion in essentially straight lines.

24. The wheel defined by claim 22, including two pair of parallel strengthening flanges, the pairs being mutually perpendicular.

* * * * *